United States Patent [19]

Prinzo

[11] 4,044,364

[45] Aug. 23, 1977

[54] GRAVITY STABILIZED CAMERA AND OPERATOR MOUNT

[75] Inventor: Joseph Prinzo, Akron, Ohio

[73] Assignee: The Goodyear Tire & Rubber Company, Akron, Ohio

[21] Appl. No.: 702,245

[22] Filed: July 2, 1976

[51] Int. Cl.² .......................................... G03B 39/00
[52] U.S. Cl. ..................................... 354/74; 354/81; 352/243; 358/229
[58] Field of Search ................... 354/74, 70, 81, 293; 352/243; 358/229

[56] References Cited

U.S. PATENT DOCUMENTS

| 2,506,095 | 5/1950 | Mantz | 354/74 |
| 3,044,346 | 7/1962 | Fieux | 354/74 X |

Primary Examiner—John Gonzales
Attorney, Agent, or Firm—F. W. Brunner; L. A. Germain

[57] ABSTRACT

An assembly is disclosed for gravity stabilizing a camera and its operator from vehicle attitude changes while aloft and comprises a camera mounting frame assembly; a universal assembly that mounts the camera frame assembly to provide front-to-rear and side-to-side, and rotational motion to the camera mounting frame; an operator mounting assembly to provide front-to-rear and side-to-side motion to the operator; and means interconnecting the camera frame assembly and the operator mounting assembly to effect an integrally combined camera/operator assembly that is stable irrespective of the motions of the airborne vehicle.

14 Claims, 9 Drawing Figures

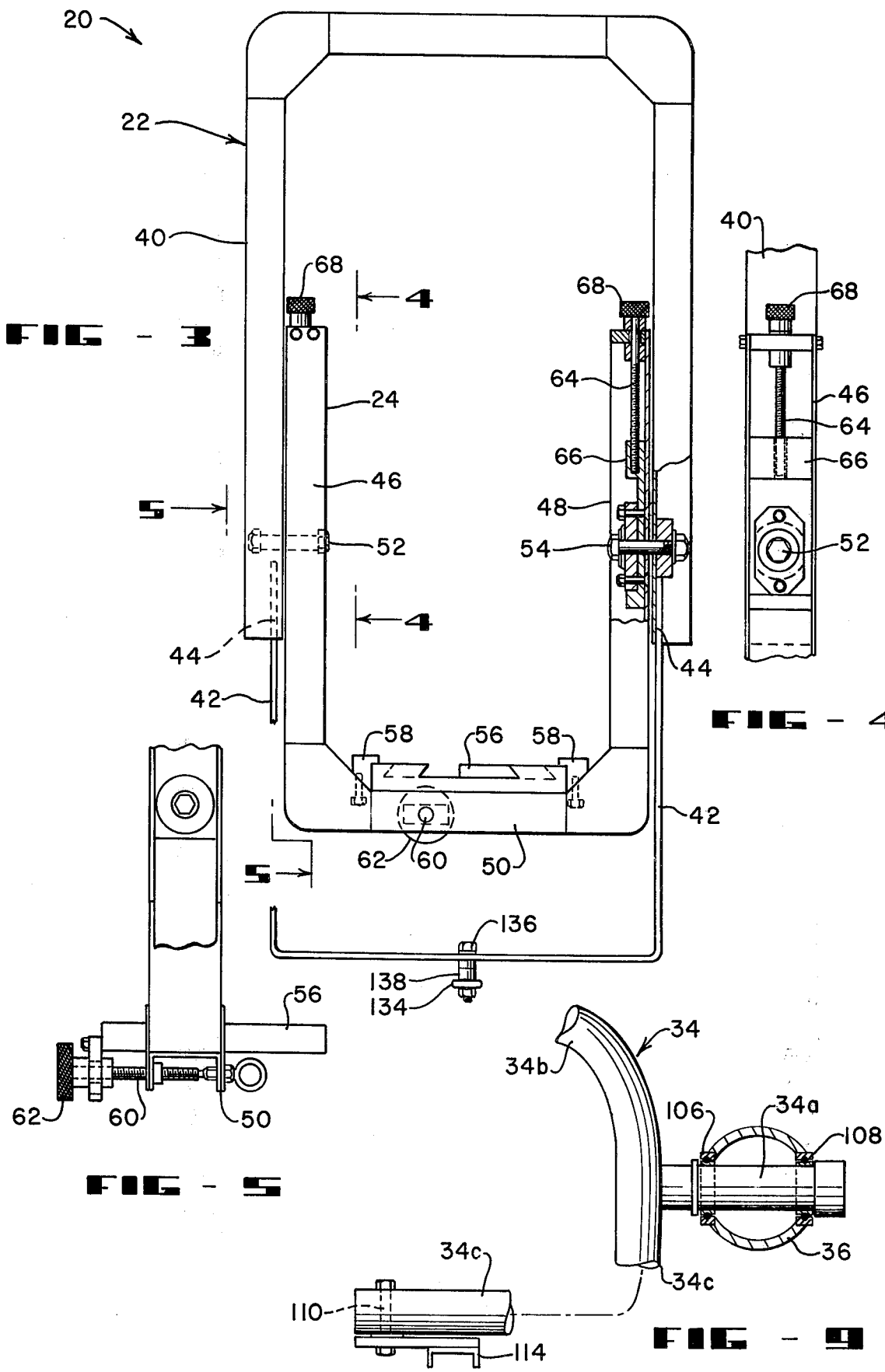

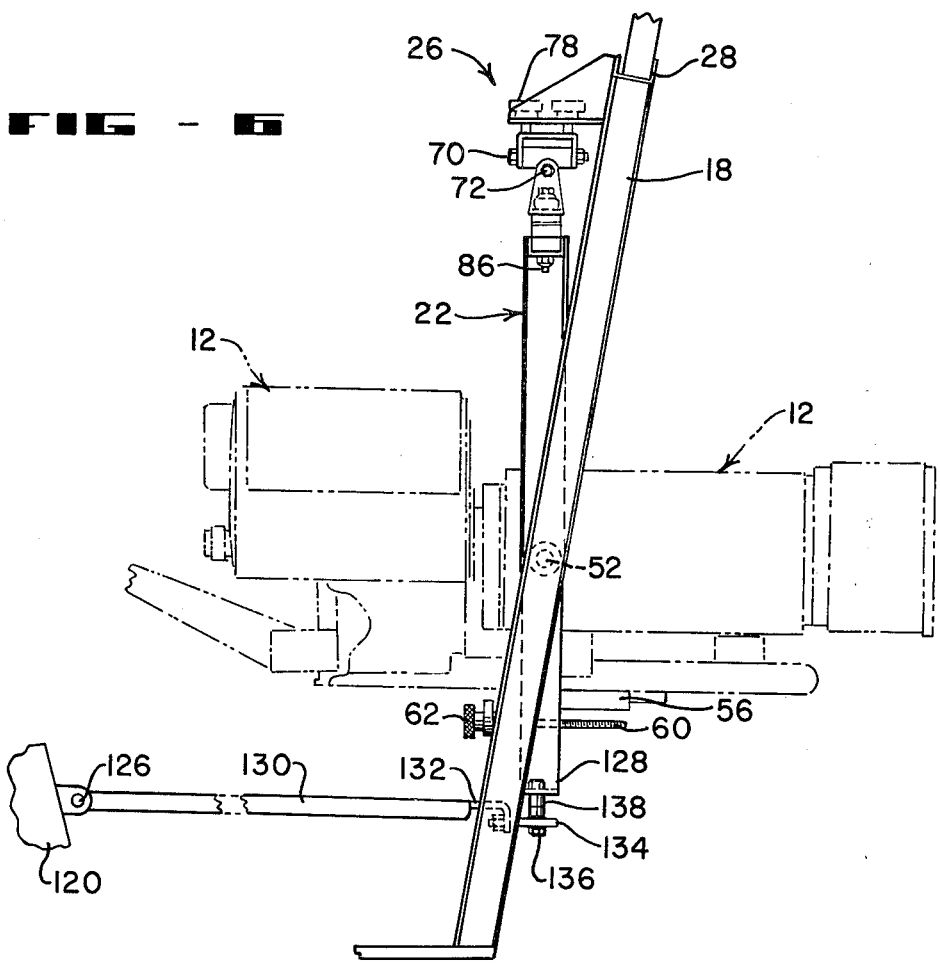
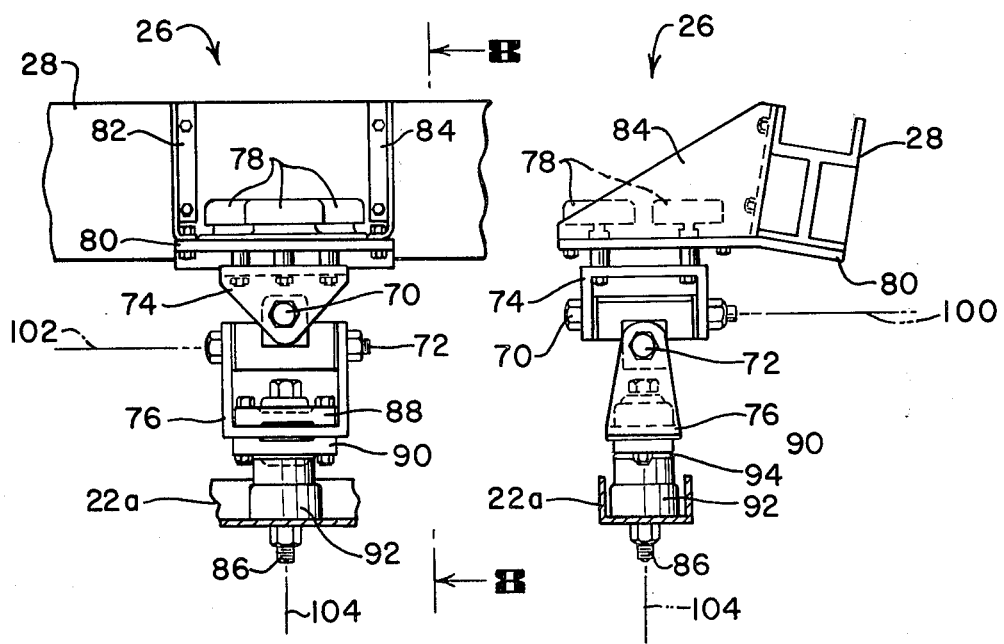

GRAVITY STABILIZED CAMERA AND OPERATOR MOUNT

BACKGROUND OF THE INVENTION

This invention generally relates to aerial cameras as may be used on aircraft and more specifically to an assembly for gravity stabilizing both the camera and its operator from aircraft motion tending to affect picture image quality.

The invention is particularly adapted to dirigibles or the like, wherein the relatively stable aerial platform provided by such a vehicle is utilized for television camera operations. For example, The Goodyear Tire & Rubber Company, Akron, Ohio, operates a fleet of "blimps" for aerial advertising purposes and also for carrying crews that televise various sporting and public interest events.

In the operation of dirigibles for TV use, winds aloft tends to cause pitch, roll and yaw motion of the vehicle and therefore, also effect camera operation as the camera operator must always compensate for vehicle motion in order to keep the camera trained on the scene below. Thus, picture quality is affected by excessive camera motion. Various camera stabilizing mounts are available and within the prior art including automated gyro mounts, and the like, all of which result in extremely sophisticated and expensive equipment that also add unwanted weight and bulk to be carried in the limited area of the vehicle control cabin.

It is therefore a primary object of this invention to provide an assembly for gravity stabilizing an aerial camera such as to substantially limit the affects of vehicle motion on camera operation.

Another object of the invention is to include the camera operator in a gravity stabilized assembly in conjunction with a stabilized camera such that both camera and operator motion are essentially independent of changes in vehicle attitude while aloft.

A further object of the invention is to provide an assembly that is effective in isolating both camera and operator and which is relatively inexpensive to assemble, extremely unsophisticated and easily maintained while adding a minimum of excess weight to the vehicle.

Accordingly, the beforementioned and related objects of the invention are accomplished in an assembly for gravity stabilizing a camera and its operator from vehicle attitude changes while aloft comprising in combination: a camera mounting frame assembly; a universal assembly that mounts the camera frame assembly to provide front-to-rear, side-to-side, and rotational motion to the camera mounting frame; an operator mounting assembly to provide front-to-rear and side-to-side motion to the operator; and means interconnecting the camera frame assembly and the operator mounting assembly to effect an integrally combined camera/operator assembly that is gravity stabilized irrespective of the motions of the airborne vehicle.

DESCRIPTION OF THE DRAWINGS

The features and advantages of the invention will be appreciated and best understood by reference to the description that follows when taken in conjunction with the accompanying drawings in the several figures of which like reference numerals identify like elements and in which:

FIG. 3 is a front elevational view of the main swing frame and tilt frame assemblies comprising the invention.

FIG. 4 is a partially broken away elevational view of the swing frame taken on line 4—4 of FIG. 3 showing the vertical c.g. adjustment for the camera tilt frame.

FIG. 5 is a partially broken away elevational view of the swing frame assembly taken on line 5—5 of FIG. 3 showing the horizontal c.g. adjustment for the camera.

FIG. 6 is a side elevational view of the main swing and tilt frames showing the camera in phantom lines.

FIG. 7 is a rear elevational view of the universal assembly that mounts the swing frame to the aircraft stationary frame.

FIG. 8 is a side elevational view of the universal assembly taken on line 8—8 of FIG. 7.

FIG. 9 is a top plan view of the operator chair yoke assembly showing its mounting to the stationary post.

DESCRIPTION OF THE INVENTION

Figure 1:
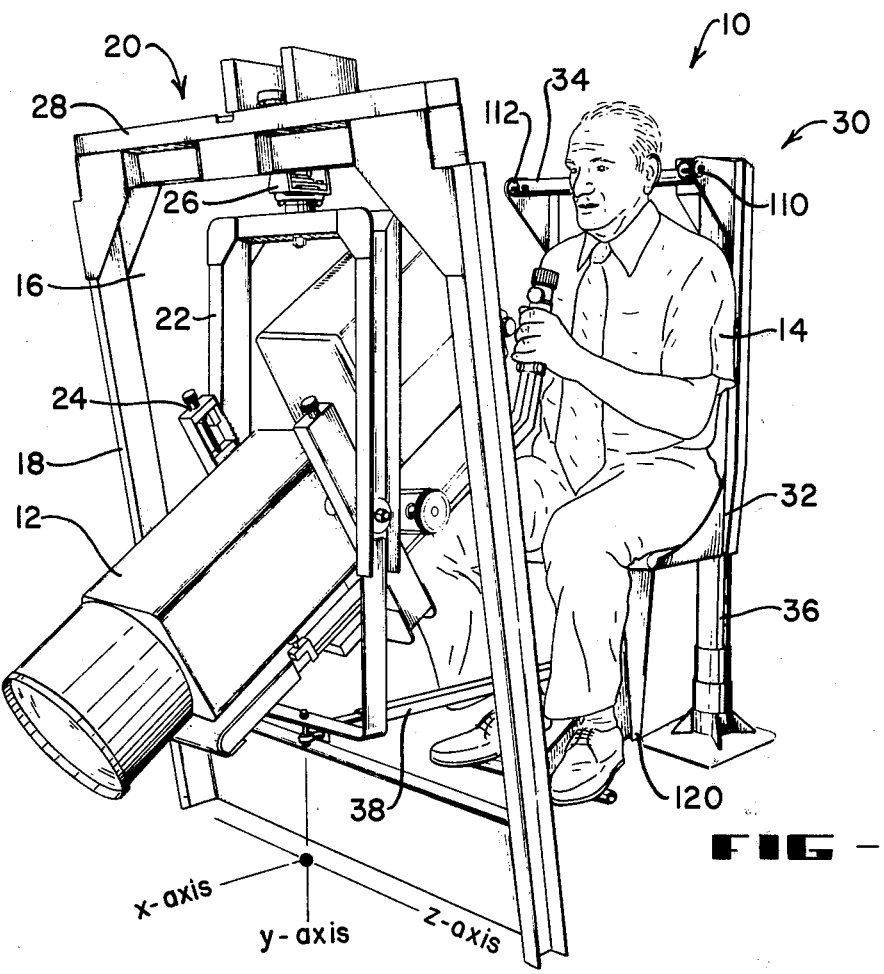
FIG. 1 is a frontal prespective view illustrating the assembly comprising the invention as it might be mounted in a side opening of a dirigible type aircraft.
Figure 2:
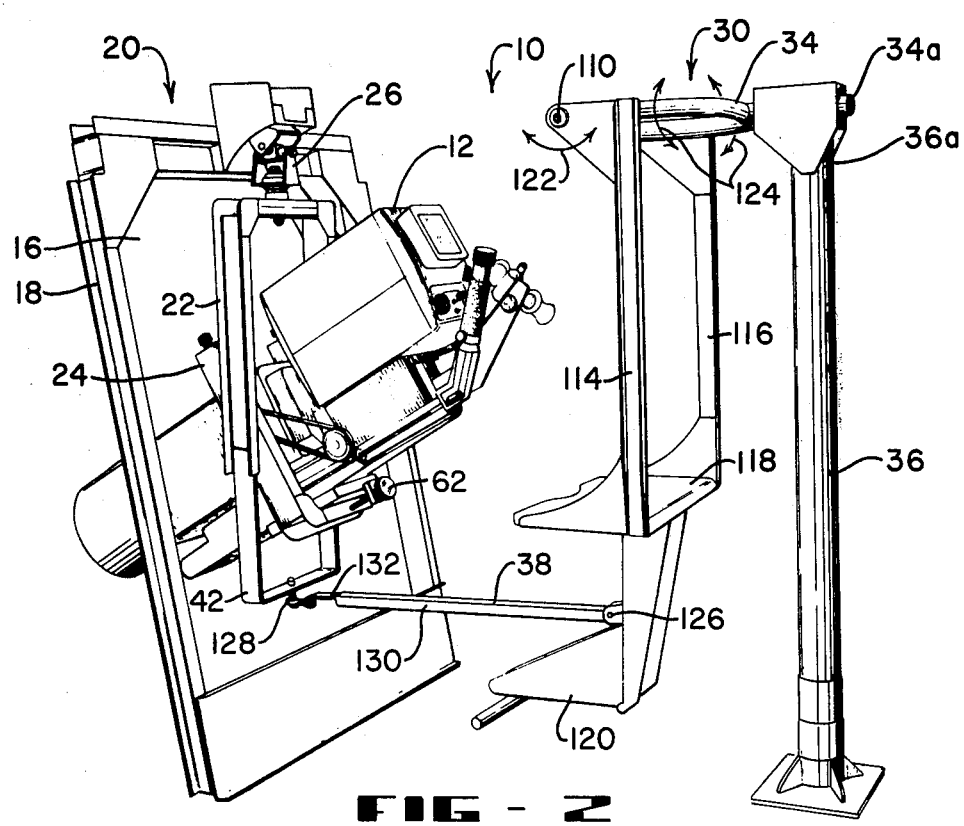
FIG. 2 is a rear perspective view illustrating the assembly comprising the invention.

Referring to the drawings, particularly FIGS. 1 and 2, there is illustrated an assembly generally indicated by reference numeral 10 for gravity stabilizing a TV camera 12 and camera operator 14. The assembly 10 is mounted in an airborne vehicle or the like such as to position the camera 12 through an opening 16 in the vehicle structure as may be defined by a framework 18. Assuming that the framework 18 defines an opening in the side of the vehicle, the directions of motion produced by the assembly 10 are referenced with respect to the x, y, and z axes illustrated in the drawings wherein the x-axis defines the pitch axis of the assembly, the y-axis the roll axis of the assembly and the z-axis the yaw or swing axis of the assembly. In order to avoid confusion in the description, all reference to motion will be with respect to the x, y, and z axes as illustrated, irrespective to the pitch, roll, and yaw motions of the vehicle.

To continue, the assembly 10 comprises a camera mounting unit generally indicated by reference numeral 20 and an operator mounting unit generally indicated by reference numeral 30. The camera mounting unit 20 comprises a main swing frame assembly 22, a tilt frame assembly 24, and a universal assembly 26 while the operator mounting unit 30 comprises a chair assembly 32, a yoke assembly 34, stationary mounting means 36, and means 38 interconnecting the camera unit 20 and chair unit 30 such that both units operate jointly with respect to pitch and roll motions as will be more fully understood as the description proceeds hereinafter.

More particularly now with respect to the camera mounting unit 20, the main swing and tilt frame assemblies 22 and 24 are specifically illustrated in FIGS. 3, 4, and 5 while the universal assembly 26 is specifically illustrated in FIGS. 7 and 8. In FIG. 3, the main swing frame 22 comprises an upper inverted U-frame 40 and a lower U- frame 42, (shown partially broken away) the legs of which are fastened at 44 to form a substantially rectangularly shaped main swing frame 22. Of course, fastening of the U-frames 40, 42 may be accomplished by bolts, rivets, or welding etc. to form a rigid structure. The tilt frame assembly 24 is mounted inside of the main swing frame assembly 22 and comprises a pair of channel legs 46, 48 and a cross member 50 such that the tilt frame is also a U-configuration. The legs 46, 48 are attached to the main swing frame by reason of bolts or pins 52, 54 such that the tilt frame is pivotable about pins 52, 54 while being confined within the main swing frame 22.

The bottom member 50 of the tilt frame 24 includes a wedge plate 56 for mounting the camera thereon in a manner well known and understood by those in the art. However, the wedge plate 56 is adjustable by reason of a pair of guides 58 and an adjusting bolt 60 as clearly illustrated in FIG. 5. By turning of the adjusting bolt knob 62, the operator may horizontally balance the camera 12 in the tilt frame assembly. This adjustment, in conjunction with a vertical adjustment mounted within the legs 46, 48 of the tilt frame, locates the camera c.g. such that very little operator effort is required to move the camera and maintain its position on the scene being televised below. Referring to FIG. 4, the vertical c.g. adjustment is shown wherein bolts 64, in each of the leg channels 46, 48, may be turned into blocks 66 mounted in respective leg channels via pins 52, 54 such that turning of the bolts by adjusting knobs 68 moves the channels 46, 48 in a relative up/down position to the pins 52, 54. Thus, the combined vertical and horizontal adjustments locate the camera c.g. balance within the swing-/tilt frame assemblies.

Referring now to FIGS. 6, 7 and 8 the swing frame 22 is mounted to the stationary frame 18 forming the window opening 16 of the vehicle. As illustrated in FIG. 6 the mounting is made to an upper cross member 28 of the frame 18 via the universal assembly 26. The universal assembly 26 comprises a pair of orthogonally oriented bolts or pins 70, 72 forming the universal joint to provide a first direction of rocking motion about pin 70 for an upper end flange 74 and a second direction of rocking motion about pin 72 for a lower end flange 76. The upper end flange 74 is mounted via shock mounts 78, to a plate 80 that is fastened to the vehicle frame member 28 by a pair of bracket plates 82, 84. The lower end flange 76 of the universal carries a vertically oriented bolt 86 through a pillow block bearing combination 88, 90 and a hub 92. The bolt 86 is attached through the upper channel member 22a of the swing frame 22 such that the frame rotates about the bolt 86 and a teflon washer 94 provides a standoff between the lower pillow block bearing 90 and the hub 92. Thus, it should be appreciated that the swing frame is provided with two swing axes 100, 102 while being rotatable about an orthogonal axis 104 such that the camera assembly 20 approximates a "plumb-bob" about the universal assembly 26 with respect to the vehicle frame 18.

Turning now to the operator mounting unit 30, reference should be made to FIGS. 1, 2, and 9. As illustrated, the unit 30 comprises a stationary post 36 mounted to the vehicle cabin floor by bolting, welding or other suitable means to provide a substantially stationary support. At the top end 36a of the post is mounted a yoke assembly 34 that is in a Y-configuration with the base of the yoke 34a rotatably carried in the post 36 by bearings 106, 108 more clearly shown in FIG. 9. The legs 34b, 34c of the yoke carry pins or bolts 110, 112 that support chair uprights 114, 116 and a seat or chair 118 at the bottom end thereof. Attached to the underside of the seat 118 is a footrest 120 such that an operator 14 occupying the seat may be free to move in a front-to-back rocking motion about pins 110, 112 and a side-to-side rocking motion about the yoke base at 34a as illustrated in FIG. 2 by arrows 122, 124 respectively.

To complete the assembly 10, an interconnection is made between the camera mounting unit 20 and the operator mounting unit 30. Reference should be made to FIGS. 1, 2, 3, and 6 wherein an interconnecting link 38 is shown pin-mounted to the chair assembly 32 at 126 and to a universal rod end 134 at the bottom of the main swing frame at 128. The link comprises a main channel member 130 pin-mounted at one end to the footrest 120 in a position to be straddled by the operator, and at the other end to an adjustable bracket 132 that is slideably received within the channel member 130 and locked in position by suitable means such as a set screw or the like. The adjustable bracket 132 is turned down at its exposed end to mount a universal rod end 134 that carries a substantially vertically oriented bolt 136 through the rod end opening. The bolt 136 is connected to the bottom, and in the center of, the main swing frame 22 through spacers 138. Being adjustable along the unit x-axis, the link 38 allows for installation variations and operator preference with respect to positioning of the camera controls. It is anticipated that the link 38 may be in the form of a platform plate or grid interconnecting the swingframe 22 and the operator unit 30 such that the operator may also stand while at the camera. In this circumstance, the seat 118 may be designed to tilt out of the way and the footrest 120 will be eliminated in favor of the platform plate.

In operation, it will be recognized that the interconnected camera/operator units are jointly capable of motion about the x and y axes. Thus, as the vehicle defined by the framework 18 is involved in pitch and roll motion, the gravity stabilized camera/operator units remain relatively motionless, being able to compensate by reason of the countering motions about the x and y axes. Further, it will be recognized that the camera unit 20 is capable of a rotating or swing motion about the universal pin 86. This motion is independent of the operator but well within the range of the operator such that the camera controls are never out of the operator's reach. The camera swing motion thus compensates for yaw motion of the vehicle and allows the operator to maintain camera position on the scene being televised below. Further, it will be appreciated that the camera may be tilted irrespective of the unit motion about the x-axis by reason of the tilt frame assembly 24. Thus, the operator may swing and tilt the camera at will, irrespective of the relative motion between the gravity stabilized unit and the vehicle.

With respect to the camera unit motion about the y-axis the limits of motion are obviously the side framing members of the window opening framework 18. Thus, in order to keep the main swing frame 22 from bumping the vehicle framework, bungee type stops may be installed at either side of the mainswing frame to limit its motion. Obviously, a wider window opening may eliminate the necessity for stops if such wider opening may be tolerated.

While certain representative embodiments and details have been shown for the purpose of illustrating the invention, it will be apparent to those skilled in this art that various changes and modifications may be made therein without departing from the spirit or scope of the invention.

What is claimed is:

1. An assembly for installation in a window opening of an airborne vehicle providing gravity stabilization of a camera and its operator against changes in vehicle attitude comprising a combination:
  A. a tilt frame mounting a camera thereon;
  B. a main frame;
  C. pin means pivotably mounting the tilt frame in the swing frame;
  D. a universal assembly hang-mounting the main swing frame in the vehicle window opening to provide rotational motion and front-to-back and side-to-side rocking motion to the swing frame;
  E. an operator mounting assembly exhibiting front-to-back and side-to-side rocking motion when occupied;
  F. means mounting the operator assembly in the vehicle; and
  G. means interconnecting the main swing frame and the operator assembly such that both move as an integral unit irrespective of the motions of the vehicle.

2. The gravity stabilized assembly as set forth in claim 1 wherein hang-mounting of the universal assembly is accomplished by attaching the universal to a substantially horizontal plate through shock mounts on the plate, said plate attached to an overhead frame member in the vehicle window opening.

3. The gravity stabilized assembly as set forth in claim 1 wherein the tilt frame comprises:
  a. a pair of leg channels and a cross channel in a U-configuration with each leg channel mounted in the main swing frame by respective pin means;
  b. a wedge plate adjustably mounted on the cross channel for attachment of a camera thereto; and
  c. means in each leg channel to adjust the tilt frame relative to the swing frame.

4. The gravity stabilized assembly as set forth in claim 3 wherein the wedge plate and tilt frame adjustments locate the c.g. balance of a camera mounted in the tilt frame.

5. The gravity stabilized assembly as set forth in claim 4 wherein the means in each leg channel for adjusting the tilt frame relative to the swing frame comprise:
  a. a block slideably received in the leg channel and mounted to the pin means, said block having a threaded bore therethrough having an axis in line with the channel; and
  b. a bolt rotatably received in the end of the leg channel to engage the threaded bore in the block such that turning of the bolt effects an adjustment of the tilt frame along the channel relative to the pin means.

6. The gravity stabilized assembly as set forth in claim 1 wherein the operator mounting assembly comprises:
  a. a Y-configured yoke;
  b. an operator seat having a pair of vertical side braces;
  c. means pivotably mounting the seat braces to the yoke such that the seat rocks in a front-to-back motion on the yoke; and
  d. means rotatably mounting the base of the yoke to the means mounting the operator assembly in the vehicle.

7. The gravity stabilized assembly as set forth in claim 1 wherein the means interconnecting the operator mounting assembly and the main swing frame comprises a platform pivotably attached to the operator seat at one end and to the main swing frame at the other.

8. The gravity stabilized assembly as set forth in claim 1 wherein the means interconnecting the operator assembly and the main swing frame comprises a link adjustable along its length and pivotably connected at one end to the operator seat and at the other end to the main swing frame.

9. The gravity stabilized assembly as set forth in claim 1 wherein the operator mounting assembly comprises:
  a. a Y-configured yoke having a pair of arms and a base member, the base member bearing mounted in a substantially horizontal position to the means mounting the assembly in the vehicle;
  b. an operator seat; and
  c. a pair of braces attached to each side of the seat at one of their ends and pin mounted to respective yoke arms at the other end, said seat effecting a front-to-rear and side-to-side rocking motion relative to vehicle motion when occupied.

10. An assembly for installation in a cabin window opening of a dirigible type vehicle to gravity stabilize a camera and an operator from changes in vehicle attitude while aloft, comprising in combination:
  A. a main swing frame;
  B. a tilt frame for mounting a camera thereon pivotably mounted in the swing frame to provide tilting motion to a camera in the frame;
  C. a universal assembly hang-mounting the swing frame in the window opening to provide front-to-back, side-to-side, and rotational motion to the swing frame;
  D. a stationary post mounted in the vehicle cabin;
  E. an operator seat assembly pivot-mounted from the post to rock in front-to-rear and side-to-side directions; and
  F. means interconnecting the main swing frame and the operator seat assembly such that the swing frame and seat assembly operate as an integral unit with respect to relative motion between it and the vehicle.

11. The assembly as set forth in claim 10 wherein the tilt frame includes means for adjusting the horizontal and vertical position of a camera such as to locate the c.g. of the camera in the frame.

12. The assembly as set forth in claim 11 wherein the operator seat assembly comprises:
  a. a yoke having a pair of arm members and a base member, the base member bearing-mounted in a substantially horizontal position to the stationary post;
  b. an operator seat; and
  c. a brace attached to each side of the seat at one end thereof and pin-mounted to respective yoke arms at the other end.

13. The assembly as set forth in claim 12 wherein the means interconnecting the main swing frame and operator seat assembly comprises a platform pivotably connected to the main swing frame and the seat assembly.

14. The assembly as set forth in claim 12 wherein the seat assembly includes a footrest attached to the underside of the operator seat and the means interconnecting the swing frame and seat assembly comprises a pivotably connected link.

* * * * *